May 17, 1966  F. KNOLL  3,251,129
SKINNING KNIFE
Filed July 12, 1963  3 Sheets-Sheet 1

May 17, 1966 F. KNOLL 3,251,129
SKINNING KNIFE

Filed July 12, 1963 3 Sheets-Sheet 2

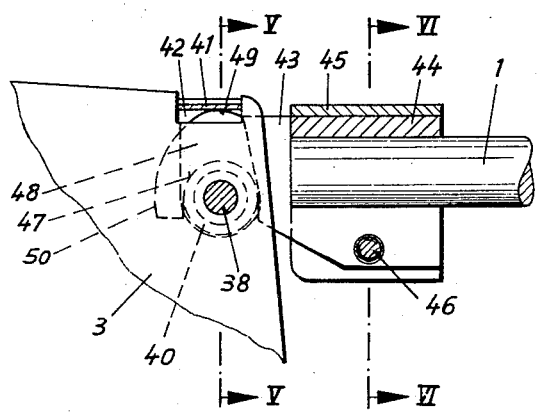
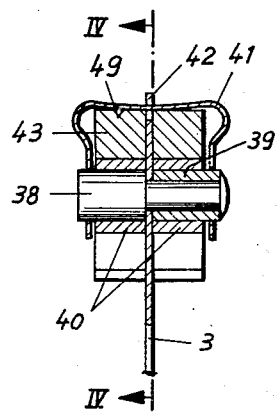
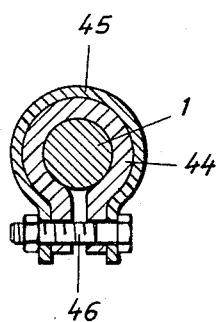

United States Patent Office 3,251,129
Patented May 17, 1966

3,251,129
SKINNING KNIFE
Fritz Knoll, 21 Konradigasse, Konstanz, Germany
Filed July 12, 1963, Ser. No. 294,477
Claims priority, application Switzerland, July 24, 1962,
8,879/62
7 Claims. (Cl. 30—272)

The invention relates to a skinning tool having a motor propelled knife blade which is guided for reciprocatory movement between adjustable protectors provided with teeth.

In skinning tools of this general type it is the function of the protectors to prevent an incision into the skin during severing of the skin from the carcass, since the value of the skin is thereby considerably reduced. The cutting edge of the blade must therefore nowhere protrude beyond the line connecting the apices of the teeth of the protectors whilst in motion; it should, at most, coincide with this connecting line when it is in its most forward position. The cutting edge of the blade has a straight portion which is inclined at an acute angle to the direction of movement, and which has an adjoining, arcuate portion at the front.

Known skinning tools of this type have serious disadvantages. For example, in the position in which the cutting edge of the blade coincides with the line connecting the two rows of tooth apices, the blade has a velocity of zero, since it is in the position of reversal. The consequence of this is that the cutting effect of the blade is very small. It is however this very position in which the velocity of the blade should have its greatest value in order to meet the requirements for maximum cutting effect.

The principal object of the invention is to provide an improved skinning tool in which the aforesaid disadvantages are eliminated.

Another object of the invention is to provide a skinning tool of the kind indicated in which the blade is guided in such a way relative to the protectors that it moves along a non-linear path as it reciprocates and preferably so that the aforesaid arcuate portion of the blade moves along correspondingly shaped toothed edge portions of the protectors for an appreciable distance before reaching its reversal point, whereby the cutting effect is markedly improved.

Other objects and advantages of the invention will be apparent from the following description when considered in conjunction with the accompanying drawings in which:

FIG. 4 is a partial longitudinal section through another embodiment of the invention;

FIG. 5 is a cross-section on the line V—V in FIG. 4; and

FIG. 6 is a cross-section on the line VI—VI in FIG. 4.

Figure 2:
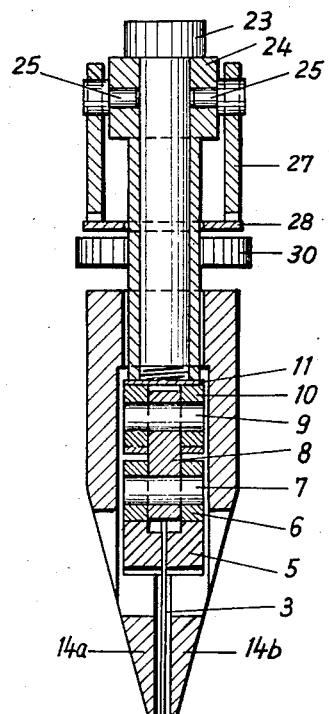
FIG. 2 is a section on the line II—II in FIG. 1.

In a handle portion of a support member 16 a motor (not shown), e.g. a pneumatic motor is provided and connected with a carrier means or spindle 1 in such a manner as to impart to said spindle a reciprocating movement. A stop ring 1a is mounted on the spindle 1 and, on its front end 1b which is of slightly conical shape, a blade holder 2 is mounted which is clamped to the spindle by means of a bolt 2a. The blader holder 2 is rigidly connected to a knife blade 3. It is preferably made of a slightly resilient synthetic material and bonded, or bonded and additionally riveted to the blade. Bearing brackets 5, into which bearings 6 (FIG. 2) are pressed, are attached to the blade 3 by means of rivets 4.

By means of a pin 7 journalled in the bearings 6 a link 8 is pivotally attached to the bearing bracket 5, and by means of a second pin 9 journalled in bearings 10 in a bracket 13, rigidly connected to the support member 16 the link 8 is pivotally connected with the bracket 13. The bearings 10 are mounted in the bracket 13 through the intermediary of a bearing support 11 which is formed by a leaf spring having an end portion bent to surround the bearings 10. The bearing support 11 is provided with a pin 12 which engages in a recess 20 in the bracket 13. Furthermore the bearing support 11 is clamped to the bracket 13 by means of a screw 30. The bracket 13 has an oblique surface 19 against which the bent portion of the bearing support 11 lies.

Furthermore a screw 23 is fixed in the bracket 13, which clamps a square-headed tubular distance piece 24. Two pins 25, about which a lever 26 pivots, are pressed into the head portion of the distance piece 24. The lever 26 carries two cams 27 at one end which, in the normal position of the lever 26 shown, press on to a spring steel plate 28, which forms part of a removable blade protector comprising two protector members 14a, 14b which are riveted or screwed together and provided with teeth 15. The plate 28 lies on the collars 29 of two adjusting screws 30, 31 which are disposed between the members 14a, 14b and both have knurled heads so that they can be easily adjusted by hand. As mentioned above, the screw 30 contacts the bearing support 11 which lies on the bracket 13. The screw 31 has a point 32 which rests in a conical recess 33 of a slide member 34, which also lies on the bracket 13. Instead of a point 32 the screw 31 could also have a hemispherical end and the recess 33 could be correspondingly shaped.

The slide member 34 has an oblique face 35 and its slotted rear wall engages the groove 37 of a knurled screw whose axis is parallel to the driving spindle 1, and which is screwed into a bridge 21 which in turn is rigidly connected with the support member 16. A pre-tensioned tension spring 18 connects the plate 28 with the bridge 21.

The skinning knife is adjusted as follows:

By turning the knurled screws 30, 31 the blade protector members 14a, 14b can be raised or lowered relative to the blade 3. Likewise, by unequal displacement of the two screws 30, 31 the angular position of the blade 3 can be varied. By turning the screw 36 the slide member 34 and thereby also the blade protector members 14a, 14b, are displaced along the blade 3. Thus by means of the three screws 30, 31 and 36 the blade protector members can be adjusted in such a way that the cutting edge of the blade 3 does not protrude anywhere beyond the teeth 15.

Figure 1:
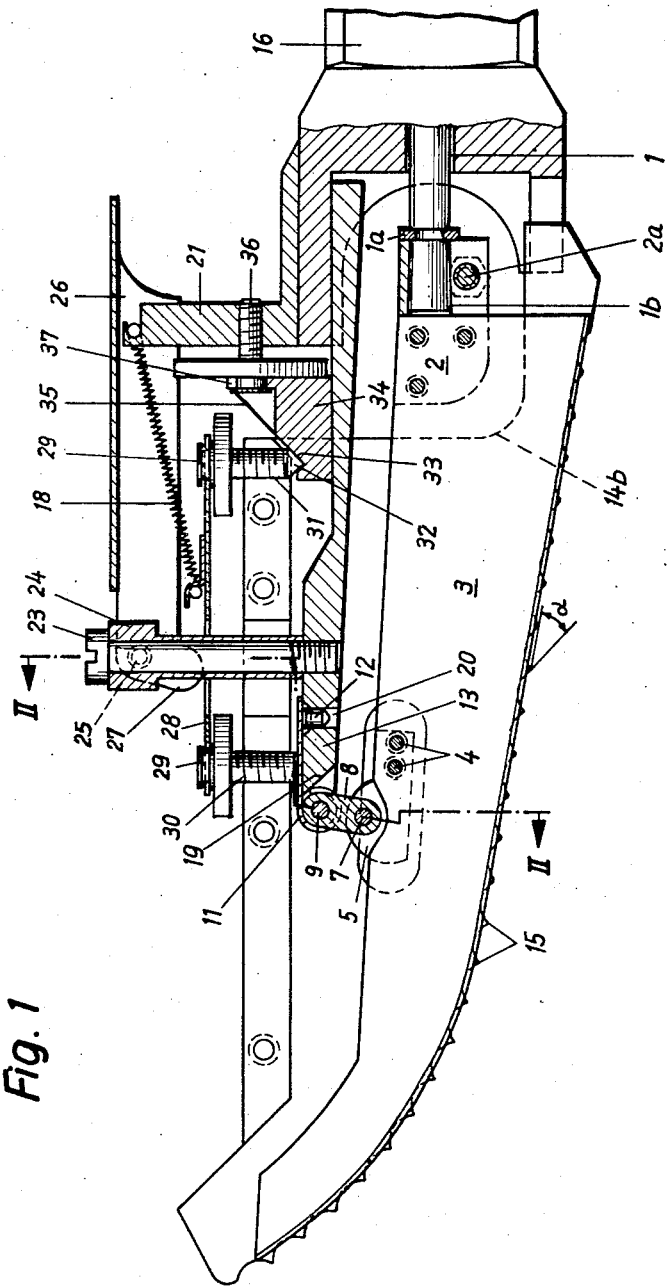
FIG. 1 is a longitudinal section through an embodiment of the skinning tool according to the invention.

For the purpose of sharpening the blade 3, the lever 26 is pivoted from the position shown in FIGURE 1 about the pins 25 so that the cams 27 no longer engage the plate 28. The spring 18 then pulls the blade protector members 14a, 14b rearwardly and upwardly over the oblique face 35 so that the blade is exposed in the region of its cutting edge for sharpening. When the lever is returned to its original position, the blade protector member slides back into its original position. The lever 26 can be constructed in such a way that it secures the adjusting screw 36 against displacement when the former is in its closed position.

Figure 3A:
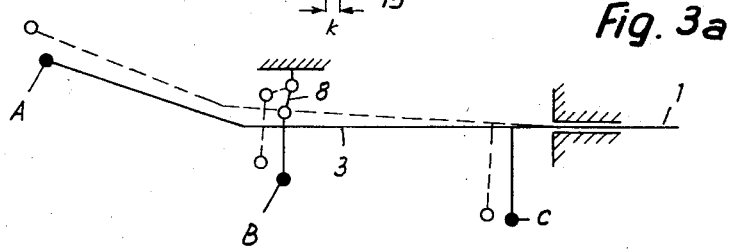
FIGS. 3a and 3b show diagrammatically two different ways of guiding the knife blade.

The suspension of the knife blade 3 by the link 8 is shown diagrammatically in FIG. 3a. It will be seen that the driving spindle connection is slightly deformed resiliently in the course of its reciprocating movement. As it reciprocates, the cutting edge of the blade, of which three points A, B, C are emphasized in FIGS. 3a and 3b, describes a two-dimensional curved movement at its straight portion as well as its front curved portion which has its maximum velocity in its most effective position in the region of the tooth apices. Moreover the tooth apex A traverses a longer path than the points B and C of the cutting edge of the blade, whereby the cutting effect in this region is increased, which is labor saving for the operator.

Figure 3B:
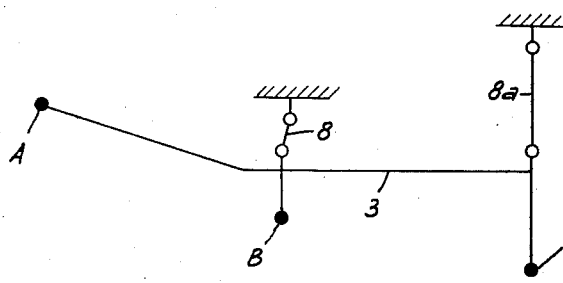

Instead of guiding the blade by means of a resilient driving spindle connection and only one link 8, as shown in FIGS. 1 and 3a, the blade could, as shown diagrammatically in FIG. 3b, also be suspended by two links 8 and 8a, which could be of different length. This construction results in the points A, B, C describing movements which follow different curves, the individual points passing through their lowest positions at different times. The same kind of movement of the blade could also be achieved by guide curves instead of links.

The blade 3 and its mounting constitute working parts which have to be exchanged after a certain operating period because of wear. This can be done in a simple manner by releasing the screw 23, unhooking the spring 18 and withdrawing the blade protector members 14a, 14b from the bracket 13. The bolt 2a is released from the now exposed blade, the bearing support 11 is raised over the oblique face 19 of the bracket 13 and the blade 3 is withdrawn from the spindle 1. For insertion of a new blade the procedure is reversed.

By extensive trials the following values were determined with regard to the pitch and form of the teeth as well as the clearance between the blade 3 and the blade protector members 14a, 14b.

The tooth pitch, i.e. the distance between two teeth on one side member of the blade protector should be not more than 8 mm. The so-called gliding angle α (FIG. 1) i.e. the angle between the line connecting two tooth apices and the tangent to the recess curve in a tooth apex may not exceed 60°. The thickness of the blade 3 should be no more than 0.7 mm., the slot $k$ between the members 14a and 14b (FIG. 2) may not exceed 0.9 mm., and the difference between the blade guide slot $k$ and the thickness of the blade 3 may not exceed 0.45 mm.

FIGS. 4 to 6 show a different means for fixing the blade to the driving spindle. The stepped bolt 38 which carries the sleeve 39 is inserted in a bore in the blade 3. The blade, bolt and sleeve are held together by riveting. The two bearings 40 are rotatably mounted on the bolt 38 and the sleeve 39 respectively on either side of the blade 3. The U-shaped tensioning-spring 41 has co-axial bores in its two legs in which the ends of the bolt 38 and sleeve 39 respectively are supported. The blade 3 has a recess 42 with which the bridge portion of the tensioning spring 41 engages. This recess serves for guiding the bridge portion of the spring 41 and for carrying the latter along with it when the blade 3 is rotated.

The blade holder 43, which is advantageously made of a synthetic material such as nylon or the like, has at its rear end a slotted hub 44. With the aid of a clip 45 and a screw 46 the hub is clamped on to the driving spindle 1. The head of the blade holder 43 into which the blade 3 is inserted, has an open recess for receiving the journals 40. The outer face of the head of the blade holder is in the form of a cam 48. When the blade 3 is inserted, the bridge portion of the tensioning spring 41 cooperates with the cam 48, namely, with its outermost face 49 thereof which is concentric with the recess 47, and presses the bearings 40 which are rotatably arranged on the blade 3, into the recess 47 of the blade holder 43. In this way the blade 3 which is in its operating position is hingedly connected with the blade holder 43 whilst nevertheless being capable of unrestrained execution of the oscillation forced upon it by reciprocation of the driving spindle 1. If the blade 3 is rotated beyond its working range, the downwardly directed face 50 of the cam 48 gradually goes out of engagement with the bridge portion of the spring 41. The tension of the spring 41 decreases as the radius decreases. Finally the interaction between the recess 47 of the blade holder 43 and the bearings 40, produced by engagement of the cam 48 with the bridge portion of the tensioning spring 41 ceases, so that the blade 3 is released.

The procedure for exchanging the blade 3 is as follows:

First the blade 3 is released, namely in the above described manner. The bearing support 11 is raised over the oblique face 19 of the bracket 13 along the now released blade 3. The blade 3 is then rotated downwards on its bearings 40 and carries the tensioning spring 41 with it. The latter slides over the portion 49 of the cam 48 and is gradually released by the face 50 of the cam 48 upon further rotation. The blade 3 with its bearing 40 can then be withdrawn from the recess 47 of the blade holder 43.

For insertion of a new blade 3 precisely the same procedure should be adopted, but in the reverse order.

While I have described herein and illustrated in the accompanying drawings what may be considered a typical and particularly useful embodiment of my said invention I wish it to be understood that I do not limit myself to the particular details and dimensions described and illustrated; for obvious modifications will occur to a person skilled in the art.

What I claim as my invention and desire to secure by Letters Patent, is:

1. In a skinning tool, a knife blade having a cutting edge, support means for said knife blade, reciprocatory carrier means mounted in said support means for reciprocatory movement relative thereto, connecting means pivotally securing one end of said knife blade to said carrier means, protective means mounted on said support means in straddling relation to the knife blade and having toothed edges extending along the knife blade adjacent the cutting edge thereof, means for adjustment of the position of said protective means relative to said support means, and guide means rockably connecting said knife blade at a point spaced from said carrier means with said support means and during the reciprocation of the knife blade causing a point on said cutting edge of the knife blade to follow a curve deviating from a line connecting the points of the teeth.

2. The skinning tool as set forth in claim 1, in which said guide means includes two links of different length, means pivotally connecting said links separately to the knife blade at longitudinally spaced points, and means pivotally connecting said links separately to said support means.

3. The skinning tool as set forth in claim 2, in which said last mentioned means includes a bearing, a pivot pin extending through said bearing and link, bracket means secured to said support means, and means detachably clamping said bearing to said bracket means.

4. The skinning tool as set forth in claim 3, in which said detachable clamping means includes leaf spring means having a portion thereof bent to form a loop receiving said bearing and a second portion extending from said loop portion, a pin secured to said second portion of the leaf spring means, and a recess in said bracket means for receiving said pin.

5. The skinning tool as set forth in claim 1, including a knife blade holder, means fixedly securing said holder to said reciprocatory carrier means, and means pivotally connecting said knife blade to said holder.

6. The skinning tool as set forth in claim 5, including spring means associated with said last mentioned pivotal connecting means permitting limited resilient relative movement between said pivotal connecting means and said holder.

7. The skinning tool as set forth in claim 6, including cam means on said holder tensioning said spring means when the knife blade is in working position relative to the carrier means, and to release said tension when the knife blade is moved from said working position.

References Cited by the Examiner

UNITED STATES PATENTS

| 1,505,030 | 8/1924 | Kench. | |
|---|---|---|---|
| 2,692,621 | 10/1954 | Steiner | 143—63 X |
| 2,911,717 | 11/1959 | Knoll | 30—272 |

WILLIAM FELDMAN, Primary Examiner.

JAMES L. JONES, Jr., Examiner.